(12) United States Patent
Scott et al.

(10) Patent No.: US 7,938,084 B2
(45) Date of Patent: May 10, 2011

(54) LIVESTOCK FEEDER WITH BREAKAWAY CAPABILITY

(76) Inventors: Sharon Scott, Lebanon, TN (US); Toby Scott, Lebanon, TN (US)

( * ) Notice: Subject to any disclaimer, the term of this patent is extended or adjusted under 35 U.S.C. 154(b) by 259 days.

(21) Appl. No.: 12/288,024

(22) Filed: Oct. 15, 2008

(65) Prior Publication Data
US 2010/0089331 A1    Apr. 15, 2010

(51) Int. Cl.
*A01K 39/00* (2006.01)
(52) U.S. Cl. .......................................................... 119/65
(58) Field of Classification Search ............... 119/51.01, 119/61.1, 61.4, 61.5, 65
See application file for complete search history.

(56) References Cited

U.S. PATENT DOCUMENTS

| | | | | |
|---|---|---|---|---|
| 5,230,304 A | * | 7/1993 | Santoro | 119/751 |
| 5,309,866 A | * | 5/1994 | Santoro | 119/650 |
| 5,383,422 A | * | 1/1995 | Morris | 119/499 |
| 5,545,844 A | * | 8/1996 | Plummer et al. | 174/379 |
| 6,045,037 A | * | 4/2000 | McGeehin | 229/125.39 |
| 6,220,473 B1 | * | 4/2001 | Lehman et al. | 220/592.27 |
| 6,457,438 B1 | * | 10/2002 | Baker | 119/498 |
| 6,497,195 B1 | | 12/2002 | Beyers | |
| 6,789,504 B1 | | 9/2004 | O'Neill | |
| 6,926,020 B2 | * | 8/2005 | Zheng | 135/126 |
| 6,964,447 B2 | * | 11/2005 | McNamee | 296/136.07 |
| 7,125,066 B2 | * | 10/2006 | McNamee | 296/136.07 |
| 7,188,713 B1 | * | 3/2007 | Espar et al. | 190/2 |
| 7,597,209 B2 | * | 10/2009 | Rothschild et al. | 220/23.87 |

* cited by examiner

*Primary Examiner* — Thomas Price
(74) *Attorney, Agent, or Firm* — Jennings Law Group, P.L.L.C.; Bethew B. Jennings, III

(57) ABSTRACT

A livestock feeder is provided wherein the seams of the feeder are detachable/re-attachable so as to break away from the livestock in case of entanglement. The break away feature may be applied to various configurations of livestock feeders. The breakaway feature is provided so as to avoid injury to the livestock and also make the livestock feeders easier to clean. Seam attachment means include, but are not limited to, hook and loop fasteners, adhesives, zippers, snaps or buttons.

20 Claims, 3 Drawing Sheets

LIVESTOCK FEEDER WITH BREAKAWAY CAPABILITY

BACKGROUND OF THE INVENTION

1. Field of the Invention

This invention relates generally to livestock feeders and more specifically to a livestock feeder designed to break away by disassembling to prevent injury to the livestock when the livestock's limbs are caught or otherwise entangled in the feeder.

2. Description of Related Art

There are many types, shapes and sizes of livestock feeders commercially available and in the prior art. They are all basically designed to maximize feeder placement due to spatial constraints, weight distribution for stability of the feeder, and to minimize feed waste issues associated with the dropping of the feed during the feeding process and/or during transport.

There are a number of problems that can be associated with current style feeders designed to be used with livestock such as, for example, horses. Many engaged in animal husbandry, specifically, those who endeavor to feed a horse, other equidae or similar grazing animal while transporting them in a trailer using a hay bag, have experienced the problem of a horse getting its foot tangled in the feed bag. Horses can become entangled in conventional feeders when attempting to jump over the feeder to avoid being kicked or bitten by other more dominant horses. When transporting livestock in trailers, many environmental, mental and physical factors can cause the horse to thrash around the trailer resulting in the horse entangling a limb, leg or foot in the feeder. Because of the weight of the livestock, especially horses, there is no way to unhook the livestock's limbs from conventional feeders. The user/caretaker would have to cut the feeder from around the livestock using a scissors or other cutting instruments, thereby permanently damaging the feeder. Further, if the feeder is not removed from the livestock in a timely manner, injury to the livestock's limbs may result from the entanglement, especially with feeders using hard materials, not capable of automatically breaking away upon entanglement. The legs of a horse, especially the forelegs, are the most common areas of injury and pain. The entire weight of the horse's body is placed upon these thin bones and delicate joints. Tendon damage can also result. There are four (4) main tendon structures in the lower limb of a horse: the superficial digital flexor tendon is the most common area of damage; the deep digital flexor tendon; the inferior check ligament, located just below the back of the knee; the suspensory ligament. Inflamed tendons which can result from entanglement, are at risk of being overstretched. The horse has no muscles below the knee and hock. The tendons are protected by sheaths or tendon bursae. Constant irritation of the sheath will result in edema, or excess fluid buildup. Without proper treatment, such leg injuries resulting from entanglement can result in poor balance, further injury and the inability to concentrate and learn during workouts and training sessions. The ultimate danger is lameness and the possibility of the need of euthanasia.

U.S. Pat. No. 6,497,195 to Beyers solves this problem by placing their hay feeding case low to the ground. U.S. Pat. No. 6,789,504 to O'Neill recognizes that horses can become entangled in conventional hay feeders and seeks to solve this problem with the height of the cylindrical body of the disclosed round bale hay feeder. These patents seem to be drawn to placement of the feeders to prevent entanglement of a horse's legs thereby preventing injury.

It is with respect to these considerations and others that various embodiments of the present invention have been made.

SUMMARY OF THE INVENTION

In accordance with the present invention, the above and other problems are solved by invention of a livestock feeder with breakaway capability. The applicant's invention is a livestock feeder; comprising an area for holding livestock feed; at least one seam, which forms the livestock feed holding area; detachable re-attachable material used to secure/ attach the seam or seams; wherein said seam or seams are detached in case of livestock entanglement with the livestock feeder. In essence, applicant's invention is a livestock feeder assembled in such a way as to support the weight of the feed to be inserted in the feeder, while providing a way to disassemble the feeder in case the livestock becomes entangled. The seams of the feeder have been constructed in such a way as to be detachable/re-attachable using some reusable attaching means, such as a hook-and-loop fasteners, such as that made by Velcro®. Usage of a reusable attaching means, such as the hook-and-loop fasteners, allow for the seams of the feeder to automatically release and break away under weight of the horse. Usage of a reusable attaching means such as a zipper allows the user to selectively disassemble the feeder from around the livestock and save the livestock from injury. This breakaway capability also makes the feeder easier to clean and to fold and transport in an unused state.

These and various other features, as well as advantages, which characterize the present invention, will be apparent from a reading of the following detailed description and a review of the associated drawings.

DETAILED DESCRIPTION THE INVENTION

Figure 1:
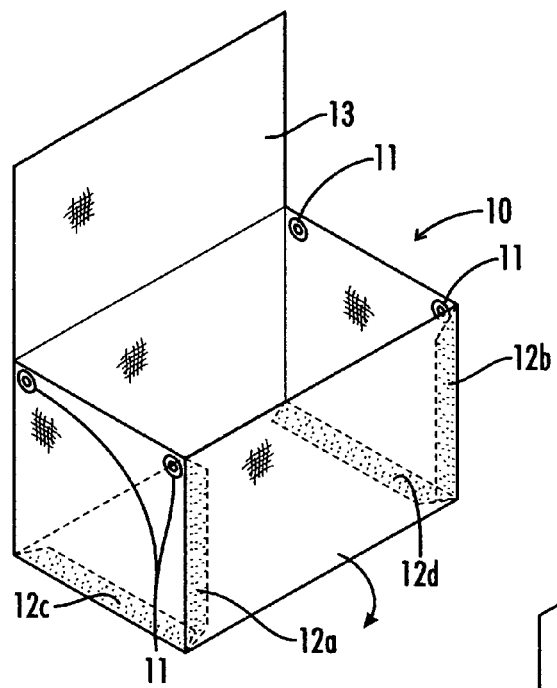
FIG. 1 is a drawing of a rectangular folding feeder embodiment of the invention wherein seams are attached.

Referring to the drawings in describing some embodiments of the invention, FIG. 1, a rectangular folding feeder 10 incorporating the principles and features of the instant invention is shown. Feeder 10 comprises seams or joints 12a, 12b, 12c and 12d, which form the enclosed area to hold the livestock feed or food. Optionally, a lid or cover 13 may be incorporated to protect the feed when livestock is not being fed or to provide a vessel in which to transport contents. Additionally, the feeder 10 may optionally be mounted to a structure, such as the wall of a trailer or stall using the back, top, sides or underside of feeder 10 and any mounting means known to one of ordinary skill in the art, such as grommets 11, as shown in the drawings.

Figure 2:
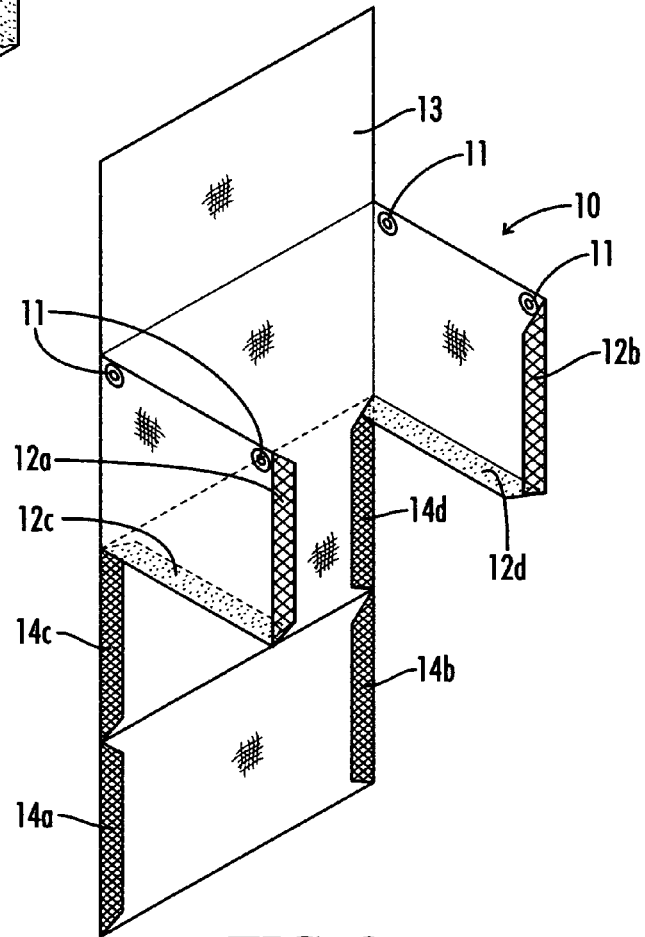
FIG. 2 is a drawing of a rectangular folding feeder embodiment of the invention showing wherein seams are detached.

FIG. 2 shows the rectangular folding feeder 10 of FIG. 1, wherein the seams or joints 12a, 12b, 12c and 12d have been disengaged or detached, thereby releasing the contents of the feeder 10, including potentially the livestock's foot. As can be seen in the FIG. 2, contact areas are coupled with at least one of the contact having some reattachable means. In this embodiment, contact area 12a is coupled to contact area 14a; contact area 12b is coupled to contact area 14b; contact area 12c is coupled to contact area 14c; and contact area 12d is coupled to contact area 14d. In this way, the foldable feeder's feed holding area is formed, disengaged and reformed.

Figure 3:
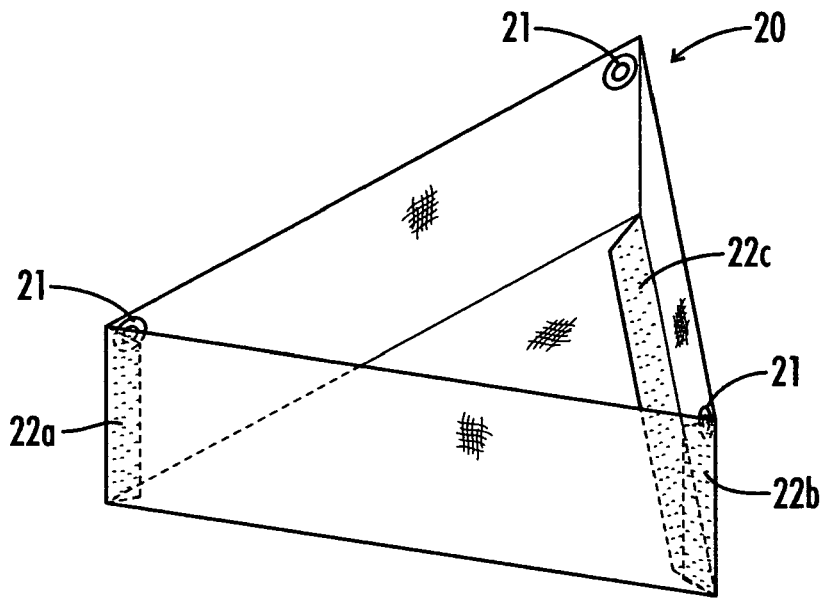
FIG. 3 is a drawing of another corner feeder embodiment of the invention showing wherein all seams are attached.

FIG. 3 shows a triangular folding corner feeder 20, incorporating the principles and features of the instant invention. Feeder 20 comprises seams or joints 22a, 22b and 22c, which form the enclosure area to hold the livestock feed or food. Additionally, this feeder 20 may be optionally mounted to a structure, such as two joining walls of a trailer or stall that form the appropriate angle, using any mounting means known to one of ordinary skill in the art, such as grommets 12, as shown in the drawings. This includes using the top, sides or underside of the feeder.

Figure 4:
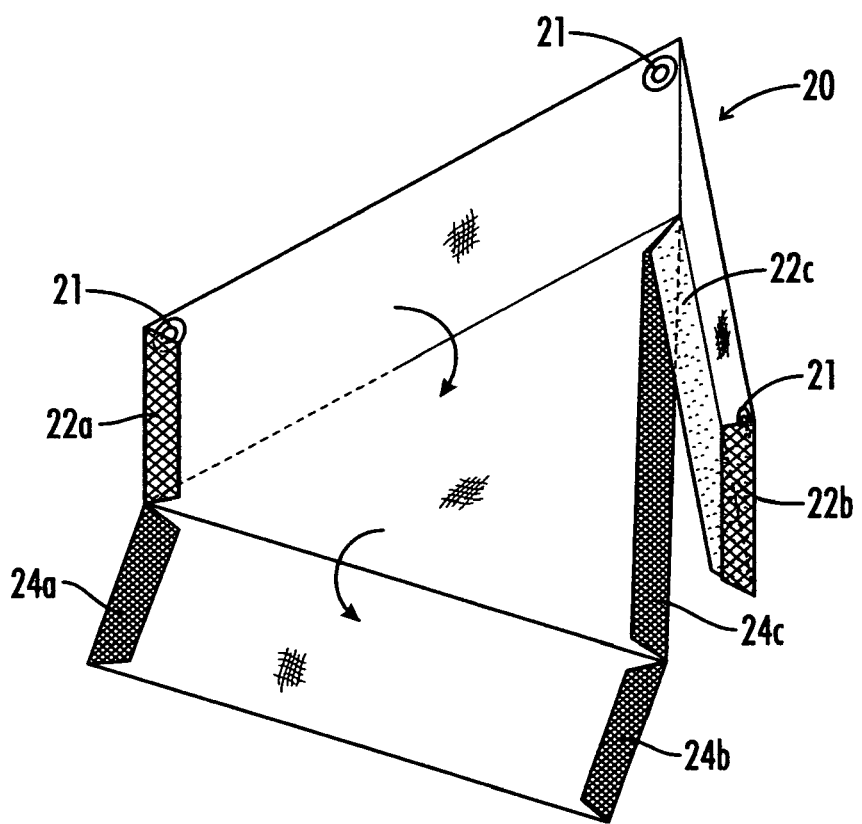
FIG. 4 is a transitional drawing of the corner feeder embodiment of the invention shown in FIG. 3, wherein the seams are detached as the feeder is in the process of being broken down.

FIG. 4 shows the triangular folding corner feeder 20 of FIG. 3, wherein the seams or joints 22a, 22b and 22c have been disengaged or detached, thereby releasing the contents of the feeder 20, including potentially the livestock's foot. As can be seen in the FIG. 4, contact areas are coupled with at least one of the contact having some reattachable means. In this embodiment, contact area 22a is coupled to contact area 24a; contact area 22b is coupled to contact area 24b; and contact area 22c is coupled to contact area 24c. In this way, the foldable feeder's feed holding area can be formed, disengaged and reformed.

Figure 5:
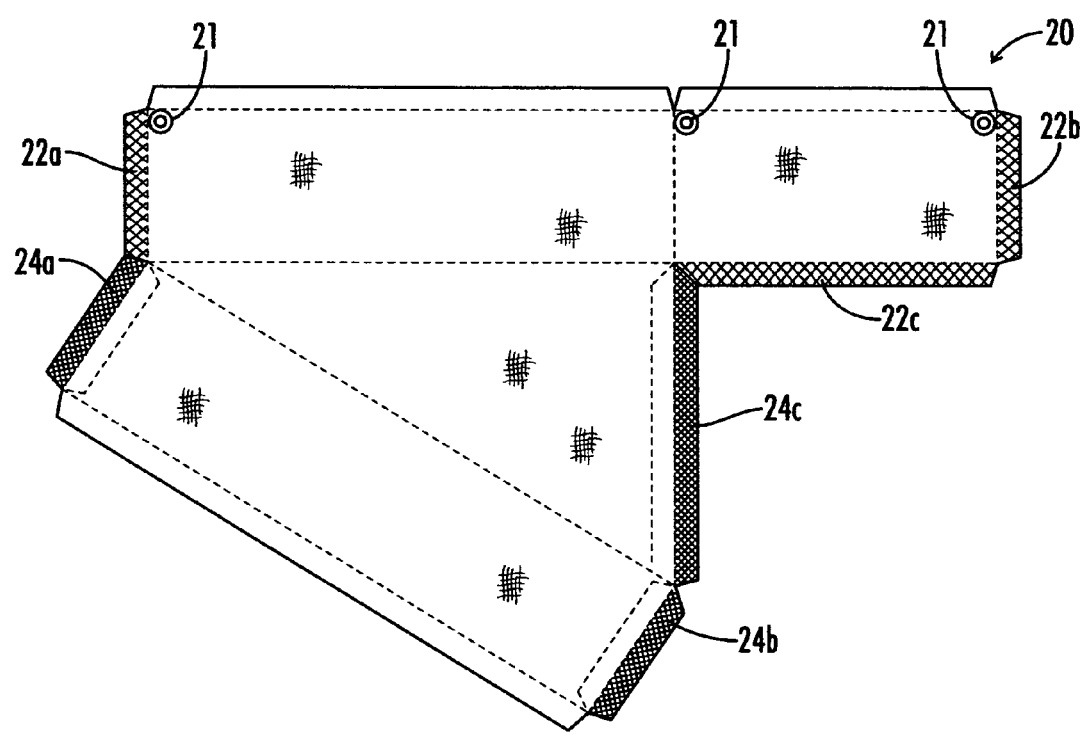
FIG. 5 is a drawing of the corner feeder embodiment of the invention shown in FIG. 3, wherein the seams are detached and the feeder is broken down.

FIG. 5 shows the triangular folding corner feeder 20 of FIG. 3 and FIG. 4, wherein all seams or joints have been totally disengaged. Also shown are the surfaces to be coupled to reform the feeder's livestock feed holding area. As in FIG. 4, contact area 22a is coupled to contact area 24a; contact area 22b is coupled to contact area 24b; and contact area 22c is coupled to contact area 24c.

In summary, there are many livestock feeders that are commercially available, however, none of the commercially available feeders found by Applicants are designed to disassemble under the weight of the livestock in the event of entanglement. Injury may result and sometime does result due to the absence of this feature. Using many of the prior art feeders, there is the potential of catching a horse's foot and not releasing it. This could cause permanent injury, which may sometimes result in euthanizing the horse. Applicants have incorporated detachable and optionally reattachable seams in their present invention. By adding detachable front and bottom seams using a means, such as hook-and-loop fasteners, to the feeder, there is no longer a hazard to the horse as the detachable seams allow the front and bottom of the feeder to tear away without injuring the horse or damaging the feeder. Applicants also provide a safer feed system designed for use in all slant load trailers to provide a safe environment for long livestock hauls. The feed bag is equipped with detachable seems using means, such as hook-and-loop fasteners, on the front and bottom to allow a breakaway feeding platform that eliminates the possibility of the horse getting one of his forelegs caught in the feed bag.

One of ordinary skill in the art will appreciate that many different seam attachment materials and methods will work with the instant invention. Although hook-and-loop fasteners and zippers are disclosed, many other attachment means are contemplated and can be used. One of ordinary skill in the art would also appreciate that livestock feeders may be made of many different materials and have many different shapes. Although the embodiments shown herein are rectangular and triangular, feeders are incorporated in a variety of trailers, barns, stalls and other spaces. As a result, many different shapes, including irregular shapes, are possible. By way of further example, feeders for slant load trailers, as well as square corner feeders, which incorporate the same concepts of the embodiments discussed herein, are also contemplated. Finally, while horses are used disclosed as exemplary of livestock in this disclosure, it is understood that the feeders invented by Applicants may be used for any animal, which would benefit from the advantages of the present invention.

Based on the foregoing, it should be appreciated that various embodiments of the invention are possible and may include many different shapes and sizes of livestock feeders. It will be apparent by those skilled in the art that various modifications or variations may be made in the present invention without departing from the scope or spirit of the invention, related to a livestock feeder with breakaway capability. Other embodiments of the present invention will be apparent to those skilled in the art from consideration of the specification and practice of the invention disclosed herein.

We claim:

1. An apparatus, comprising:
a livestock feeder with an area for holding livestock feed;
at least one seam, which forms said area;
detachable reattachable material used to attach said at least one seam; and
wherein said at least one seams is detached in case of livestock entanglement with said livestock feeder.

2. The apparatus of claim 1, wherein said detachable re-attachable material is a hook-and-loop fastener.

3. The apparatus of claim 2, wherein said hook-and-loop fastener is a brand by Velcro®.

4. The apparatus of claim 1, wherein said detachable re-attachable material is a reusable adhesive substance.

5. The apparatus of claim 1, wherein said detachable re-attachable material is at least one zipper.

6. The apparatus of claim 1, wherein said detachable re-attachable material is snap buttons.

7. The apparatus of claim 1, wherein the detachable re-attachable material detaches automatically upon said livestock entanglement with said livestock feeder.

8. The apparatus of claim 7, wherein said entanglement includes application of a predetermined weight within said livestock feeder causing the at least one seam to detach.

9. The apparatus of claim 8, wherein said at least one seam is calibrated to detach at said predetermined weight determined by a caretaker.

10. The apparatus of claim 1, wherein said at least one seam is detached by a user upon discovery of said livestock entanglement with said livestock feeder.

11. The apparatus of claim 1, wherein said livestock feeder can be folded.

12. The apparatus of claim 1, wherein said livestock is at least one horse.

13. The apparatus of claim 1, wherein said detachable reattachable material is continuously along said at least one seam.

14. The apparatus of claim 1, wherein said at least one seam extends from the center of said area to the outer perimeter of said area.

15. The apparatus of claim 1, wherein after said at least one seam is detached because of livestock entanglement, a user reattaches said at least one seam using said detachable reattachable material.

16. An apparatus, comprising:
a livestock feeder with at least one area for holding livestock feed;
at least one seam, which forms said at least one area;
at least one detachable reattachable material used to attach said at least one seam;
a calibrator for setting a predetermined weight of livestock to be fed;
wherein said at least one seams is detached in case of livestock entanglement with said livestock feeder based on said predetermined weight of said livestock; and
wherein after said at least one seam is detached in case of livestock entanglement with said livestock feeder, a user reattaches said at least one seam using said at least one detachable reattachable material.

17. The apparatus of claim 16, wherein said at least one detachable reattachable material is continuously along said at least one seam.

18. The apparatus of claim 16, wherein said at least one detachable re-attachable material is a hook-and-loop fastener.

19. The apparatus of claim 16, wherein said at least one seam extends from the center of said area to the outer perimeter of said area.

20. The apparatus of claim 16, wherein said livestock is at least one horse.

* * * * *